(12) United States Patent
Mucher et al.

(10) Patent No.: US 10,144,264 B2
(45) Date of Patent: Dec. 4, 2018

(54) STABILIZER BAR AND PROCESS OF PRODUCING A STABILIZER BAR

(71) Applicant: Muhr und Bender KG, Attendorn (DE)

(72) Inventors: Mario Mucher, Attendorn (DE); Sergio Macedo, Weissensee (DE); Boris Ditzer, Kirchhundem (DE)

(73) Assignee: Muhr und Bender KG, Attendorn (DE)

( * ) Notice: Subject to any disclaimer, the term of this patent is extended or adjusted under 35 U.S.C. 154(b) by 166 days.

(21) Appl. No.: 15/251,190

(22) Filed: Aug. 30, 2016

(65) Prior Publication Data

US 2017/0066299 A1   Mar. 9, 2017

(30) Foreign Application Priority Data

Sep. 4, 2015   (DE) .................. 10 2015 114 897

(51) Int. Cl.
| | |
|---|---|
| *B60G 17/005* | (2006.01) |
| *B60G 21/055* | (2006.01) |
| *B21D 53/88* | (2006.01) |
| *B21C 37/08* | (2006.01) |

(Continued)

(52) U.S. Cl.
CPC ............ *B60G 21/055* (2013.01); *B21C 37/08* (2013.01); *B21D 53/88* (2013.01); *B23K 31/027* (2013.01); *B60G 11/18* (2013.01); *B60G 21/0551* (2013.01); *C21D 1/18* (2013.01); *C21D 9/0068* (2013.01); *C21D 9/08* (2013.01); *C22C 38/04* (2013.01); *B23K 2101/06* (2018.08); *B23K 2103/04* (2018.08); *B60G 2206/012* (2013.01); *B60G 2206/427* (2013.01); *B60G 2206/72* (2013.01); *B60G 2206/724* (2013.01); *B60G 2206/8103* (2013.01); *B60G 2206/8106* (2013.01); *B60G 2206/81035* (2013.01); *B60G 2206/81062* (2013.01);

(Continued)

(58) Field of Classification Search
CPC ............ B60G 21/055; B60G 2206/427; B23K 31/027
See application file for complete search history.

(56) References Cited

U.S. PATENT DOCUMENTS

| | | | | |
|---|---|---|---|---|
| 7,744,708 B2 * | 6/2010 | Lopez | ................ | B60G 21/055 148/574 |
| 7,896,983 B2 * | 3/2011 | Koyama | ................ | B23P 15/00 148/519 |

(Continued)

FOREIGN PATENT DOCUMENTS

| | | |
|---|---|---|
| DE | 2846445 A1 | 4/1980 |
| DE | 19758292 A1 | 11/1998 |

(Continued)

*Primary Examiner* — Faye M Fleming
(74) *Attorney, Agent, or Firm* — Bejin Bieneman PLC (57) ABSTRACT

A stabilizer bar for a chassis of a motor vehicle comprises a torsion spring portion and two arms bent away from the torsion spring portion; wherein the arms each comprise a formed end portion with a through-opening and a tubular portion, wherein the torsion spring portion comprises a hardened structure with a strength of at least 1000 MPa; and wherein the formed end portions comprise a hardened structure with a strength of at least 800 MPa. A process of producing a corresponding stabilizer is further disclosed.

10 Claims, 3 Drawing Sheets

(51) Int. Cl.
   *B23K 31/02*   (2006.01)
   *B60G 11/18*   (2006.01)
   *C21D 1/18*    (2006.01)
   *C21D 9/08*    (2006.01)
   *C22C 38/04*   (2006.01)
   *C21D 9/00*    (2006.01)
   *B23K 101/06*  (2006.01)
   *B23K 103/04*  (2006.01)
   *C21D 1/10*    (2006.01)
   *C21D 1/42*    (2006.01)
   *C21D 1/25*    (2006.01)
   *C21D 1/673*   (2006.01)

(52) U.S. Cl.
   CPC .. *B60G 2206/8201* (2013.01); *B60G 2206/83* (2013.01); *B60G 2206/84* (2013.01); *C21D 1/10* (2013.01); *C21D 1/25* (2013.01); *C21D 1/42* (2013.01); *C21D 1/673* (2013.01); *C21D 2221/00* (2013.01); *Y02P 10/253* (2015.11)

(56) References Cited

U.S. PATENT DOCUMENTS

| | | |
|---|---|---|
| 2007/0216126 A1 | 9/2007 | Lopez et al. |
| 2011/0290382 A1 | 12/2011 | Kikuchi et al. |
| 2012/0318409 A1* | 12/2012 | Mizuno ................ B60G 21/055 148/506 |
| 2014/0060709 A1 | 3/2014 | Tange et al. |
| 2017/0028808 A1* | 2/2017 | Katsuno ............. B60G 21/0551 |
| 2018/0073096 A1* | 3/2018 | Wakabayashi ......... B21D 53/88 |

FOREIGN PATENT DOCUMENTS

| | | |
|---|---|---|
| DE | 102009011818 A1 | 10/2009 |
| DE | 112011100846 T5 | 1/2013 |
| DE | 102013101276 A1 | 8/2014 |
| GB | 2058689 A | 4/1981 |
| JP | H07 237428 A | 9/1995 |
| KR | 20140048429 A | 4/2014 |

* cited by examiner

STABILIZER BAR AND PROCESS OF PRODUCING A STABILIZER BAR

CROSS-REFERENCE TO RELATED APPLICATIONS

This application claims priority to German Application No. 10 2015 114 897.8, filed on Sep. 4, 2015, which application is hereby incorporated herein by reference in its entirety.

BACKGROUND

A stabilizer bar is a spring element which counteracts body roll of a vehicle, thus improving the vehicle dynamics and the position of the vehicle on the road. The ends of the stabilizer are each connected to the wheel suspension of a vehicle axle. At its two ends, the stabilizer is attached to the vehicle body.

From US 2007/0216126 A1 a method for producing a tubular stabilizer bar is known. The method comprises providing a tubular bar, heating the bar, quenching the bar, and forming the tube to a desired shape by bending operations. The stabilizer bar has a generally elongate central body with first and second stabilizer arms with first and second ends. Following the bending operations, the first and second ends are further formed to a shape that allows attachment of the stabilizer bar to the suspension of an automobile.

From DE 11 2011 100 846 T5 a massive stabilizer produced by cold forming, hardening and tempering of a steel material, is known. After tempering, the stabilizer has a hardness in a middle portion of 400 HV (Vickers hardness number).

From US 2011/0290382 A1 a high-strength stabilizer steel for vehicles is known containing 0.07% to 0.2% C and 1% to 3% Mn and further elements. The stabilizer has a torsion portion and a pair of arm portions with terminals at the ends. US 2014/0060709 A1 discloses a similar stabilizer bar.

From DE 197 58 292 A1 a tubular stabilizer is known having a back portion, bent transition portions, and two leg portions. The wall thickness of the back portion is smaller than the wall thickness of the transition portions.

From DE 10 2009 011 818 A1 a process of producing a stabilizer with two stabilizer bearings is known. For this, the stabilizer is heated in portions and then brought into surface contact with the stabilizer bearing and pressed into position.

From DE 10 2013 101 276 A1 a process of producing a vehicle stabilizer is known. It is proposed that strip material made of a steel alloy with a high manganese content is formed to a tube profile and is subsequently welded into an endless tube. The tube is then drawn over a mandrel, wherein depending on the degree the drawing operation, intermediate annealing can take place. It is mentioned as an advantage that the produced stabilizer does not require any hardening and tempering.

The end portions of stabilizers can have a reduced loading capacity for geometric reasons due to cross-sectional changes, and for material structure reasons due to forming and cooling processes. The wall strengths of the end portions of stabilizers are usually designed according to the forces and loads to be introduced by the wheel carrying components.

In the case of high loads and reduced material thicknesses it may be necessary to provide additional reinforcements, which works against requirements for light weight. Furthermore, leakages may occur at the stabilizer ends which, in the worst possible scenario, may lead to material failure.

SUMMARY

Disclosed herein is a stabilizer bar for a chassis of a motor vehicle and a method of producing such a stabilizer. The stabilizer requires as little material as possible, has a high durability and, while having good density properties, can be produced easily. Furthermore, an appropriate production method allows reliably producing a highly stressable and preferably lightweight stabilizer whose ends have good tightness properties.

A hardened stabilizer bar for a chassis of a motor vehicle comprises: a torsion spring portion and two arms bent away from the torsion spring portion, wherein the arms each comprise a formed end portion with a through-opening and a tubular portion, wherein the torsion spring portion comprises a hardened structure with a strength of at least 1000 MPa (megapascals), and wherein the formed end portions comprise a hardened structure with a strength of at least 800 MPa.

An advantage is that, because of the high strength values of the end portions, the stabilizer bar can also withstand high loads and provides a long service life. Due to the high strength values, the wall thickness of the end portions can be reduced, where applicable, so that the weight of the stabilizer can be reduced with the loading capacity remaining the same. The formed and hardened stabilizers can be produced easily and with high process reliability by press-hardening.

The term "bar" used herein includes in particular a generally hollow, elongate member which may be formed to a predetermined shape that is required for the stabilizer to be used in its intended location in the vehicle. The stabilizer bar can also be referred to as tubular stabilizer, or simply as a stabilizer. The stabilizer may have a substantially circular cross section, although it is understood that other cross-sections such as oval, or rectangular are also possible.

The stabilizer is heat-treated, hardened, and tempered, which, in the context of the present disclosure, means that the stabilizer comprises a greater hardness than the starting material. For this, the starting material is heated and subsequently quenched, so that, relative to the starting micro structure, there is achieved a harder micro structure. In an example, the stabilizer is made of a hardenable steel material which, for hardening purposes, is heated to an austenitising temperature and subsequently cooled quickly. The rapid cooling operation results in an at least a partial, preferably a complete, transformation of the structure into martensite. For this, steels can be used, wherein with respect to the time-temperature-transformation diagram, the transformations in the pearlite and bainite stages is shifted towards longer periods, so that the upper critical cooling rate is relatively low and can be reached even in the core of the workpiece. The steel material preferably has a carbon content of less than 0.5 percent by weight and/or a manganise content of 0.5 to 3.0 percent.

After having been hardened, the stabilizer can be tempered. Tempering causes the strength of the initially brittle martensite to decrease, but to increase the toughness. Overall, by selecting suitable tempering temperatures, the desired property combinations of the component can be achieved. The combination of hardening and subsequent tempering of the component is referred to as "hardening and tempering."

The hardness and strength of the stabilizer are interdependent. In an example, depending on the required strength value, the torsion spring portion can have a hardness of at least 310 HV (Vickers hardness number), possibly at least 410 HV, and possibly at least 500 HV. The formed end regions can comprise a hardness of at least 250 HV, possibly 310 HV, and possibly at least 400 HV.

The stabilizer can be produced from a tubular member as the starting material from which the arms are bent off. The formed end portions of the arms can be produced by hot forming. For this, the end portions to be formed are first heated, so that the hardness in these portions is reduced again as compared to the hardness of the starting material, and subsequently formed. More particularly, it is proposed that the formed end portions each comprise a flattened end region which is perforated, i.e., punched, as well as an adjoining transition region. The through-openings produced by perforation, i.e., punching, serve to connect the stabilizer to a connecting part, for example, a chassis component of the motor vehicle. In an example, the end portions and/or end regions are closed so as to be liquid-proof and/or gas-proof. This can be effected via the forming operation for producing the formed end portions. More particularly, it is proposed that the stabilizer is configured, i.e., produced, that the stabilizer ends are gas-proof up to an internal pressure of at least 2 bar and/or that the internal pressure, after 5 minutes, still amounts to at least 0.75 times the maximum pressure applied. In this context, the hardened structure of the end regions, in addition to the forming operation, contributes towards achieving these impermeability values.

The transition region between the flattened end region and the tube portion of the arm comprises a variable cross-section along the length of the transition region. In other words, the transition region forms a cross-section-changing transition between the end region and the tubular arm portion. The transition region comprises a strength of possibly at least 800 MPa, and possibly of at least 1000 MPa, depending on the technical requirements of even more than 1200 MPa. According to an advantageous example, the transition region has at least approximately the same strength and hardness as the punched end region of the arm.

The transition region is adjoined by the tubular arm portion which can comprise a partial region with a lower strength and hardness respectively. In this partial region, the strength can be smaller than 0.7 times the strength of the torsion spring portion and/or greater than 0.5 times the strength of the torsion spring portion. To ensure that the partial region with the reduced strength does not have any adverse effects on the total strength and service life of the stabilizer, it is proposed more particularly that said partial region comprises a distance from the transition region, which distance can amount to at least half the diameter of the tubular arm portion.

According to an example the stabilizer bar can comprise a variable wall thickness along the length. More particularly, the wall thickness can be configured in accordance with the technical requirements, i.e., regions subjected to higher loads can be provided with a greater wall thickness and regions where a greater degree of elasticity is needed, the wall thickness can be reduced accordingly. More particularly, it is proposed that a wall thickness of at least the end regions is smaller than a maximum wall thickness of the stabilizer bar. For example, the wall thickness of the end regions can be at least 20% smaller than the maximum wall thickness of the stabilizer. The maximum wall thickness can be provided, more particularly, in the bent portions. Also, a mean wall thickness of the transition region can be reduced relative to the maximum wall thickness of the stabilizer.

Furthermore, a process of producing a stabilizer bar for a chassis of a motor vehicle comprises the steps of: producing a tube; bending the tube so as to form arms; hardening and tempering the tube before or after the arms have been formed, so that the hardened and tempered tube comprises a hardened structure with a strength of at least 1000 MPa; heating an end-sided partial portion of the arms after the tube has been hardened and tempered, wherein the strength in the end-sided partial portion is reduced to a value below 800 MPa; after heating, hot forming the end-sided partial portion to obtain a formed end portion; punching the formed end portion for producing a through-opening; hardening the formed end portion such that the formed end portion obtains a hardened structure with a strength of at least 800 MPa.

Analogously, the disclosed process offers the same advantages as the disclosed product, so that in respect of same, reference can be made to the above description. It is understood that all the features relating to the product also apply to the process and vice versa. Overall, because of the high strength of the end portions, the disclosed stabilizer is also able to withstand high loads and features a long service life; with the same load capacity of the stabilizer, material and weight can be saved. According to the disclosed process, the end portions undergo two hardening processes, i.e., one in connection with hardening and tempering of the tube serving as the starting material, and a second one in connection with partially hardening the end portions after the forming operation.

According to an possible example, the end-sided partial portions can be heated by induction heating. In this process, the electrically conductible component is heated by eddy current losses, with the heat being generated directly inside the component itself. The device used for induction heating can be an induction coil, induction heating or an induction furnace. The induction device generates a magnetic alternating field via an A.C. current flowing through a coil, which field induces eddy currents in the component.

Further, it is proposed that the process steps of warm forming the end-sided partial portions and of punching out a through-opening in the formed end portion are carried out in one single tool.

According to a first possibility, the process of hardening the formed end portions can be carried out in the same tool as the process of hot forming and punching. In this case, the tool is provided as a combined warm forming, punching and hardening tool. By carrying out the processes of hot forming, punching and hardening in one single tool, production is quick with short cycle times. Further it is proposed that initially one arm of the stabilizer is heated at the respective end-sided partial portion and then placed into the combined hot forming, punching and hardening tool, with the end-sided partial portion being formed into the formed end portion, with the opening in the end portion being punched and the end portion being hardened by rapid cooling. Then the stabilizer with its formed and hardened first arm is removed from the tool, so that subsequently the second arm can be produced accordingly. The combined tool can be designed such that working an arm is performed in the chronological order of forming, punching and hardening. However, in principle it is also possible that punching and hardening are performed with a time overlap, or that punching takes place after hardening. An advantage of using a combined tool is that energy consumption for production is low overall, because the component needs to be heated only once for hot forming and hardening. The process of combining the hot forming and hardening operations can also be referred to as press hardening.

According to an alternative possibility, hardening of the formed end portions can also be carried out as a separate process step by means of a separate device. In terms of time, hardening can follow the hot forming process, e.g., in such a way that the stabilizer is removed from the hot forming tool and further rapidly cooled by the device. Rapid cooling can be effected for example by an air volume stream or a liquid bath such as an oil bath or a water bath. However, hardening can also be performed separately, in terms of time and space, from the combined hot forming and punching process. In this case, the formed end portions of the stabilizer would have to be heated to an austenitising temperature and subsequently rapidly cooled in a cooling device. If a separate hardening process is chosen, it is possible according to a first variant to initially heat both end portions to the austenitising temperature and subsequently rapidly cool them in the hardening and cooling device. According to a second variant, both end portions can also be heated and cooled one after the other.

According to an possible example, the tube can be produced by the sub-steps of: rolling a steel strip; forming the steel strip into a slotted tubular member; and longitudinally welding the slotted tubular member into a closed tube. For producing a variable plate thickness along the length of the stabilizer, according to a first possibility, the tube can be drawn over a stepped mandrel. Tubes produced in this way are also referred to as Tailor Drawn Tube. Alternatively, the variable wall thickness of the stabilizer can also be produced in that the steel strip used as the starting material for the tube is subjected to flexible rolling before the tube is formed. In the case of flexible rolling, strip material having an essentially uniform plate thickness is rolled to a variable plate thickness along the length by changing the rolling gap during the process of rolling the strip material. The portions with different thicknesses produced by flexible rolling extend transversely to the longitudinal direction, i.e., to the rolling direction of the strip material. After completion of the flexible rolling process, the strip material can be wound up into a coil again and directly moved to a different processing place, or further processing can take place immediately, for example by the strip material being formed into a tubular member and subjected to longitudinal welding. Alternatively, the tube can also be produced in a seamless form as a drawn tube.

Hardening and tempering of the tube is achieved by applying the sub-steps of heating the tube to an austenitising temperature; hardening the heated tube; and tempering the quenched tube. Heating the material to an austenitising temperature means that the material is heated to a temperature at which at least some austenite is produced. The austenitising temperature is preferably above the Ac3 point, which means that for steel materials it is preferably above 800° C. The subsequent step of quenching to a lower temperature takes place, more particularly, between the upper and lower critical cooling rate, i.e., at such a speed that at least some martensite is produced. Quenching avoids a diffusion of iron and carbon, so that the cubic surface-centered austenite is transformed into the tetragonally distorted volume-centred grid of the martensite by means of a sliding and folding process. Depending on the cooling speed, it is also possible for bainite to occur. Quenching is followed by tempering in which case the hardened tube is heated to moderately high temperatures below the A1-temperature and subsequently cooled again. Tempering causes internal stresses to be reduced, i.e., hardness and strength are reduced, whereas toughness increases. The process combination of hardening and tempering can also be referred to as quenching and tempering.

SUMMARY OF THE DRAWINGS

Examples will be described below with reference to the drawings.

DETAILED DESCRIPTION

Figure 1A:
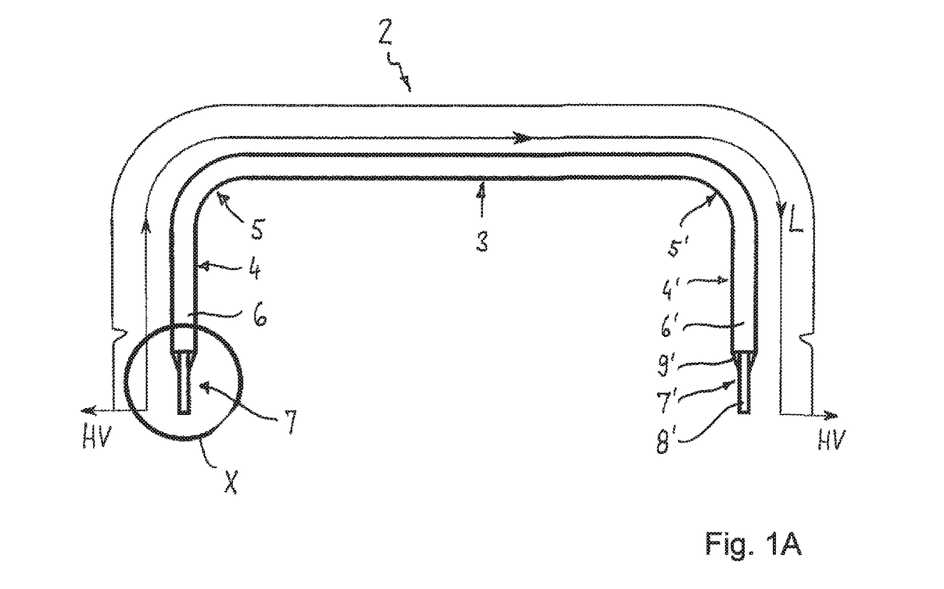
FIG. 1A shows an example stabilizer bar in a plan view with the hardness curve as a function of the length.
Figure 1B:
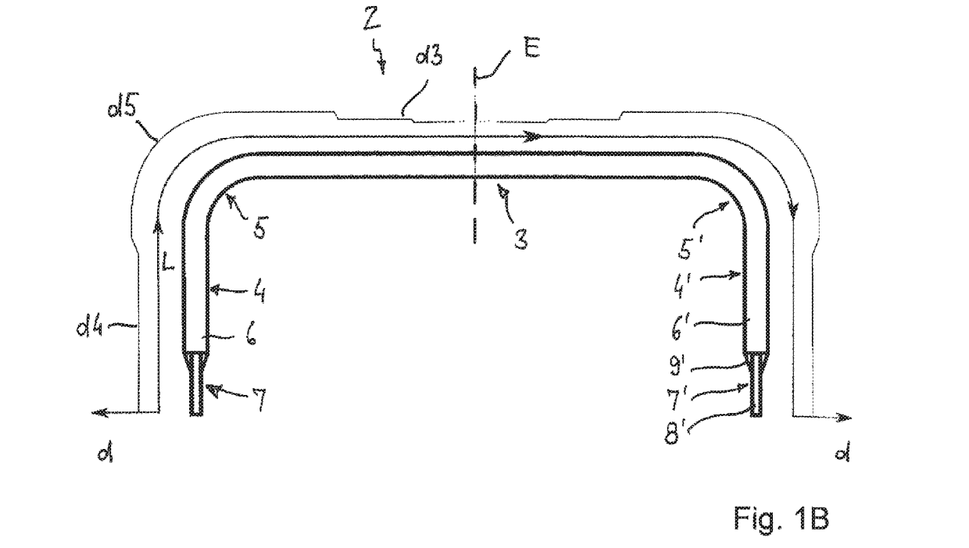
FIG. 1B shows an example stabilizer bar in a plan view with the wall thickness curve as a function of the length.
Figure 2A:
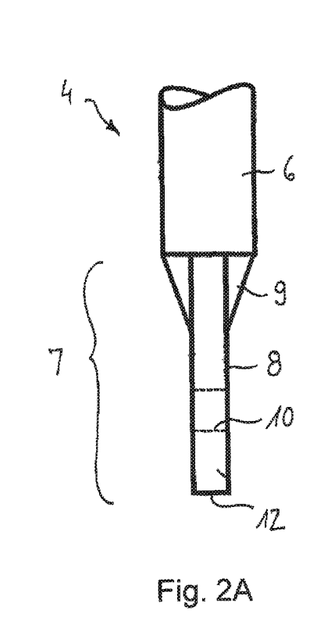
FIG. 2A shows a detail of the stabilizer bar according to FIGS. 1A and 1B in a plan view.
Figure 2B:
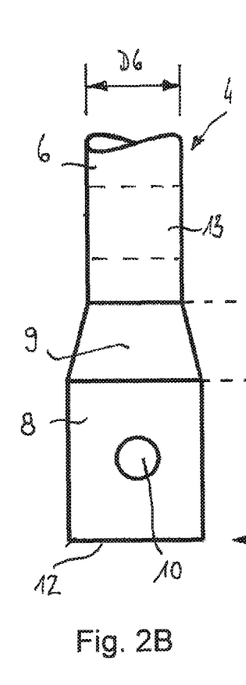
FIG. 2B shows a detail of the stabilizer bar according to FIGS. 1A and 1B in a side view.
Figure 2C:
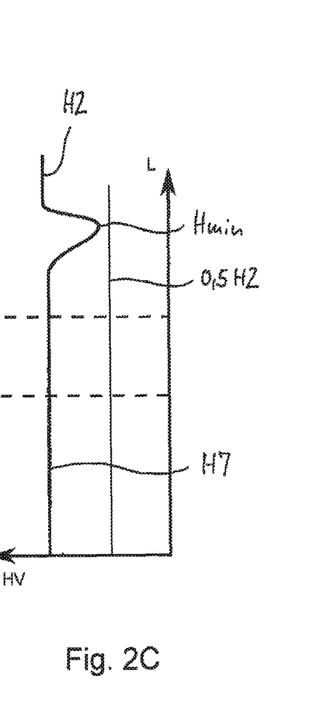
FIG. 2C shows a detail of the stabilizer bar according to FIGS. 1A and 1B with the hardness curve.

FIGS. 1 and 2 which will be described jointly below show an example stabilizer 2 for use in the chassis of a motor vehicle. In particular, the stabilizer 2 is configured as a generally tubular, elongate member which is formed to the required shape to be used in the vehicle. The stabilizer 2 comprises a torsion spring portion 3 which can also be referred to as torsion bar spring portion or stabilizer back, as well as two arms 4, 4' which are bent away at an angle from the torsion spring portion 3, which arms can also be referred to as lever arms. Between the torsion spring portion 3 and the arms 4, 4' there is formed a respective bent portion 5, 5'. It can be seen that the present stabilizer 2 is mirror-symmetric relative to a central plane E and comprises an arm 4, 4' at both ends. However, it is understood that the stabilizer can also be asymmetric and, depending on the space conditions, it can also comprise non-identical arms 4, 4'. If, within the framework of the present disclosure, reference is made to only one of the arms 4, 4', it is understood that this may also apply to the other arm 4' as well.

The torsion spring portion 3 extends in a substantially straight line and can be fixed, for example by two bearings (not illustrated) to the vehicle chassis, for example in the engine chamber or at the underbody of the motor vehicle. The arms 4, 4' serve to connect the stabilizer 2 to the two wheel suspensions (not illustrated) of an axle of the motor vehicle. In the present embodiment, the arms 4, 4' extend substantially straight and, in a plan view of the stabilizer 2, they enclose right angles respectively with the torsion spring portion 3. However, it is to be understood that, depending on the installation conditions and the type of application, the arms can also have different designs, i.e., forms. For example, the arms can also be cropped or bent and/or extend at an angle which deviates from 90° relative to the torsion spring portion 3.

By using the arms 4, 4' of the stabilizer 2 in connection with an associated wheel suspension of the motor vehicle, the two suspensions are coupled to one another in a resilient way. When cornering, i.e., when curves are negotiated, a compression stroke of the vehicle wheel on the outside of the curve and a rebound stroke of the wheel on the inside of the curve cause vehicle roll. Such compression stroke is transferred via the respectively deflected arm 4, 4' and the torsion spring portion 3 to the opposed arm 4', 4. In this way vehicle roll, i.e., a rotational movement around the longitudinal vehicle axle, is counteracted.

The stabilizer 2 is produced from a closed, one-part tubular member, from which end portions are bent away, which end portions form the arms 4, 4'. A hardenable steel material is used as starting material which can comprise a carbon content of less than 0.5 percent by weight and a manganese content of 0.5 to 3.0 percent by weight. Apart from iron, it is possible to use other common alloying elements such as chromium and/or boron. The stabilizer 2, respectively the tubular member used for producing the stabilizer, is heat-treated, i.e. hardened and tempered; the tubular member can be hardened and tempered before or after bending the arms 4, 4'.

Starting from the bent portion 5, 5', each arm 4, 4' comprises a tubular portion 6, 6' with an at least substantially constant cross-section along the length and a formed portion 7, 7'. The formed portions 7, 7' each comprise a flattened region 8, 8' and a transition region 9, 9'. The transition region 9, 9' connects the flattened region 8, 8' to the tubular portion 6, 6' and accordingly comprises a variable cross-section along the length of the respective transition zone 9, 9'.

It can be seen in particular in FIG. 2B that the flattened end regions 8, 8' of the formed end portions 7, 7' are perforated, i.e., punched, with the through-openings 10, 10' serving to connect the stabilizer 2 to a chassis component of the motor vehicle. The flattened end regions 8, 8' are closed so as to be liquid-proof and/or gas-proof, e.g., up to at least 2 bar internal pressure, thus preventing dirt and water from penetrating. The gas-proof sealing operation takes place in connection with the forming operation. In this connection it is advantageous if the stabilizer ends are gas-proof in such a way that after 5 minutes the internal pressure amounts to at least 0.75 times the maximum pressure applied.

Furthermore, it can be seen in FIG. 2A that the transition zones 9, 9' between the adjoining flattened end region 8, 8' and the tubular portion 6, 6' of the arm 4, 4' comprise a variable cross-section along the length, so that a cross-section changing transition between the flat end region 8, 8' and the tubular arm portion 6, 6 is provided.

As already mentioned above, the stabilizer 2 is made of a hardened and tempered steel material. Depending on the starting material, the basic strength of the hardened and tempered steel material amounts to at least 1000 MPa, sometimes 1200 MPa, and optionally at least 1400 MPa. For example, a stabilizer tubular member made of a hardened and tempered steel material 26MnB5 can comprise a basic strength of approximately 1400 MPa to 1585 MPa. A tube member made of hardened and tempered steel material 34MnB5 can comprise an even higher basic strength of approximately 1585 to 1680 MPa.

In the finish-produced condition of the stabilizer, the formed end portions 7, 7' comprise a strength of at least 800 MPa, more particularly at least 1000 MPa. The strength of the formed end portions 7, 7' can be lower than the basic strength of the hardened and tempered steel material and, for example, it can amount to at least 0.8 times to 0.9 times the strength of the hardened and tempered steel material. If the hardened and tempered steel material has a strength of 1200 MPa, the strength of the formed end portions 7, 7' accordingly could thus range between 980 MPa and 1080 MPa, for example.

The strength of the stabilizer is related to the hardness for which an exemplary curve is shown in FIG. 1A, and an enlarged detail for one of the arms 4, 4' of the stabilizer 2 is shown in FIG. 2C. The basic hardness of the stabilizer 2 is referred to as H2 and the hardness of the end portions 7, 7' as H7. A mean basic hardness is designated as 0.5H2. It can be seen that the hardness H7 of the end portions 7, 7' is slightly lower than the basic hardness H2, more particularly corresponding to approximately 0.9 times the basic hardness H2. Example values for the hardness of the stabilizer 2 can be given as follows: the basic hardness H2 can amount to at least 410 HV, more particularly 500 HV. The formed end portions 7, 7' can have a hardness H7 of at least 310 HV, more particularly of at least 400 HV.

Furthermore, it can be seen that the end portions 7, 7', starting from an end face 12, 12' along the respective end region 8, 8' and the adjoining transition region 9, 9', comprise a substantially constant hardness H7 and strength, respectively. More particularly, the respective hardness and strength is greater than 0.8 times the basic hardness H2 and the basic strength of the stabilizer 2, respectively. It is not until the tubular portion 6, 6' of the arm 4, 4' which, for geometric reasons, comprises a greater surface inertia moment than the formed end portion 7, 7', that a partial region 13, 13' with a reduced hardness Hmin is provided. In this case, the reduced hardness Hmin is greater than the mean basic hardness 0.5H2 of the stabilizer 2 and smaller than 0.7 times the basic hardness H2, i.e. 0.7H2>Hmin>0.5H2. The soft partial region 13, 13' is clearly spaced from the transition region 9, 9', more particularly by a length which is greater than half the diameter D6 of the tubular arm portion 6, 6'.

FIG. 1B shows the wall thickness curve of the stabilizer 2 along the length L. It can be seen that the stabilizer 2 comprises a variable wall thickness d along the length L and it is understood that the wall thickness along the length can also be constant. In the present embodiment, the wall thickness curve is symmetric relative to the central plane of the stabilizer. It is proposed more particularly that the wall thickness d4 of the arms 4, 4' is reduced relative to the wall thickness d5 of the bent portions 5, 5'. In the bent portions 5, 5' the stabilizer has the greatest thickness d5. Starting from the two bent portions 5, 5' and looking towards the central plane, the stabilizer 2 again comprises a reduced wall thickness d3 in the torsion spring portion 3, which, in the present embodiment, comprises two partial regions with different thicknesses. It is to be understood, however that, depending on the load conditions of the stabilizer, a different number of partial regions with variable thickness can also be provided which deviates from two, i.e. one, three or more than three partial regions with different thickness. The transition regions d3, d4, d5 are constant, i.e. continuous, so that the most uniform load conditions possible is achieved, with stress peaks being avoided. It is proposed more particularly that the formed end portions 7, 7' comprise a wall thickness d7 which is reduced by at least 20% relative to the maximum wall thickness d5 of the stabilizer.

For producing a tubular member with a variable thickness along the length, it is possible, for example, to pull a tube initially having a constant wall thickness over a stepped mandrel, so that portions with different wall thicknesses are produced in the tube (a Tailor Drawn Tube). Alternatively, the tube can be produced from flexibly produced strip material as a starting material, a process which will be explained in greater detail below. Such flexibly produced strip material is also referred to as a Tailor Rolled Blank.

An exemplary process for producing the stabilizer 2 comprises the following steps: producing a tube; bending the arms 8, 8' of the tube, hardening and tempering the tube before or after the arms 8, 8' have been bent so that the hardened and tempered tube comprises a hardness structure with a strength of at least 1000 MPa; heating an end-sided partial portion of a first one of the arms 8, 8' after the tube has been hardened and tempered, respectively, with the strength of the end-sided partial portion being reduced to below 800 MPa; hot-forming the end-sided partial portion after having been heated for producing the formed end portion 7, 7'; punching the formed end portion 7, 7' to produce a through-opening 10, 10'; hardening the formed end portion such that the formed end portion comprises a hardened structure with a strength of at least 800 MPa. Subsequently, the second arm 8, 8' will be treated in the same way.

The tube can be produced by the sub-steps: rolling a steel strip; forming the steel strip into a slotted tubular member; and longitudinally welding the slotted tubular member to form a closed tube. For producing a variable material thickness along the length of the stabilizer 2, the steel strip can be flexibly rolled prior to being formed into a tube or a tube with an initially constant wall thickness can be flexibly drawn after having been welded. In the case of flexible rolling, the strip material obtains a variable thickness along the length by changing the rolling gap during said process. The operation of bending the arms 8, 8' takes place in a suitable bending device. Hardening and tempering takes place via the sub-steps: heating the tube to an austenitising temperature; quenching the heated tube; and tempering the quenched tube. Hardening and tempering preferably take place after the arms 8, 8' have been bent, but in principle, it can also take place before hardening and tempering. After hardening and tempering the hardened and tempered tubular member 2' is existent having a substantially constant cross-section along the length L and having the above-mentioned basic strength of at least 1000 MPa.

Based on this, the end-sided partial portions of the arms 8, 8' are produced as explained below with reference to FIGS. 3A to 3C.

Figure 3A:
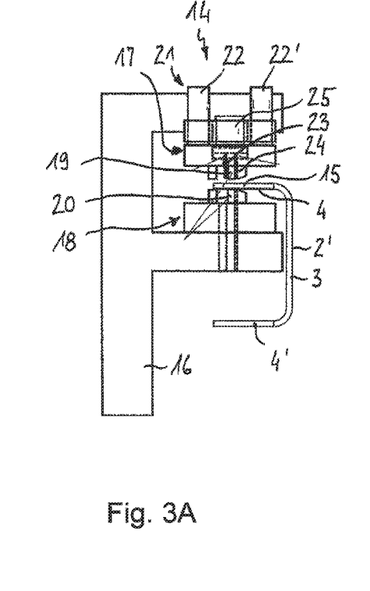
FIG. 3A shows an example device for producing a stabilizer according to FIG. 1A with a first arm inserted into the device for working purposes.
Figure 3B:
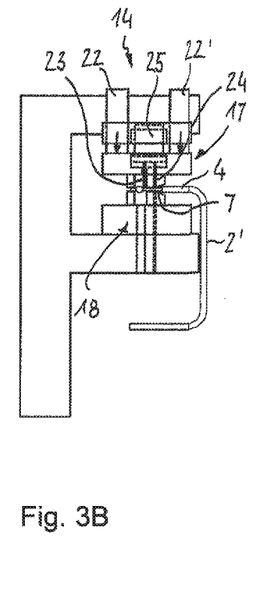
FIG. 3B shows an example device for producing a stabilizer according to FIG. 1A after an end-sided partial portion of the first arm has been formed.
Figure 3C:
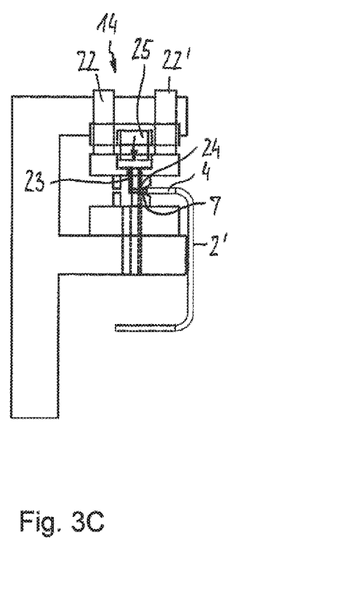
FIG. 3C shows an example device for producing a stabilizer according to FIG. 1A after the formed partial portion of the first arm has been cut and perforated.

FIGS. 3A to 3C show a combined hot-forming, punching and hardening tool 14 which, below, can also simply be referred to as the "tool". Before the hardened and tempered tubular member 2' is placed into the tool 14, the end-sided partial portion 15 of the first arm 8 is heated, which can be effected by induction heating. The length of the heated partial portion 15 at least corresponds to the length of the formed end portion 7 of the arm 8. After the partial portion 15 has been heated, the tubular member 2' is quickly placed into the tool 14, as shown in FIG. 3A.

The combined hot-forming, punching and hardening tool 14 comprises a rack 16, an upper tool part 17 and a lower tool part 18. At the upper tool part 17, an upper forming die 19 is provided which cooperates with a corresponding lower forming die 20 of the lower tool part 18. For forming the arm 8, the upper tool part 17 is moved towards the lower tool part 18, with the end-sided partial portion 15 of the tubular member 2' positioned therebetween and formed by the forming dies 19, 20, i.e., being flattened and pressed. To that extent, the two forming dies form parts of the hot-forming device and can also be referred to as pressing- or flattening dies. For moving the upper tool part 17 a driving unit 21 is provided which, for example, can comprise two hydraulic cylinders 22, 22'.

FIG. 3B shows the tool 14 with moved-out hydraulic cylinders 22, 22' and correspondingly lowered upper tool part 17 as well as the formed condition of the tubular member 2'. It can be seen that the previously tubular partial portion 15 of the arm 4 has been formed into the formed portion 7 with a flattened end region 8 and a transition region 9.

Subsequently, the projecting end of the formed portion 7 is cut off and the flattened end region 8 is perforated, respectively punched. For this purpose, the tool 14 has at the upper tool part 17 a cutting device 23 for cutting the projecting end and a punching device 24 for perforating the flattened end region 8. The cutting device 23 and the punching device 24, which can also be referred to as perforating device 24, comprise a common drive unit 25 which typically comprises a hydraulic cylinder. While the pressing force of the forming device 19, 20 for forming the arm 8 is maintained, a cutters and a punch move through the forming dies 19, 20 and perforate the flattened region 7 and cut the end.

FIG. 3C shows the tool 14 with a moved-out hydraulic cylinder 25 and a correspondingly lowered cutting and punching device 23, 24. It can be seen that a projecting end of the formed portion 7 is cut off and that the through-opening 10 has been produced in the flattened end region 8.

Hardening of the formed end portions 8 is achieved by rapidly cooling the end portion by a planar contact of the workpiece with the forming and pressing dies 19, 20. The rapid cooling process takes place so quickly that an at least partial martensitic structure is obtained in the formed end portion 8. More particularly, a diffusion of iron and carbon is avoided, so that the cubic surface-centred austenite, which is present after the partial portion 15 has been heated, is transformed into the tetragonally distorted, space-centred grid of the martensite as the result of a displacement or folding process. In respect of the density of the flattened end region 8, it is advantageous that martensite, due to its grid structure, comprises a slightly larger volume than austenite, so that the wall portions of the flattened end regions, which wall portions lying on one another, are particularly solid and densely layered.

Figure 4A:
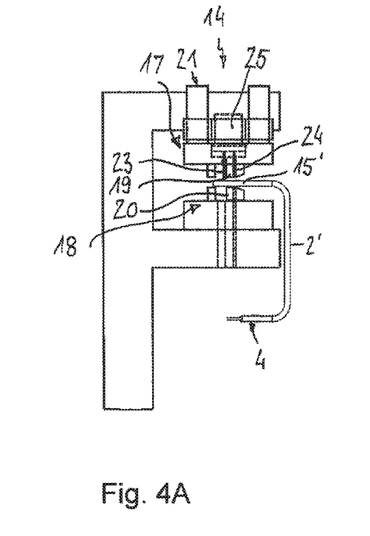
FIG. 4A shows the device according to FIGS. 3A-3C with the second arm inserted into the device for working purposes.
Figure 4B:
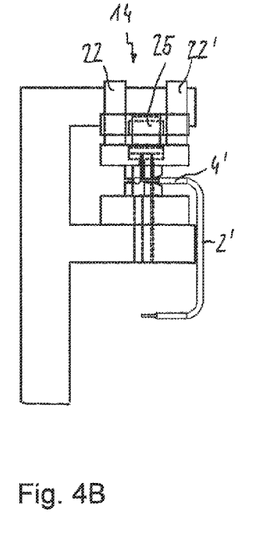
FIG. 4B shows the device according to FIGS. 3A-3C after the end-sided partial portion of the second arm has been formed.
Figure 4C:
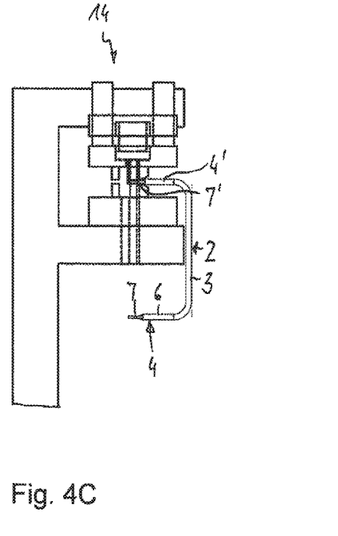
FIG. 4C shows the device according to FIGS. 3A-3C after the formed partial portion of the second arm has been cut and perforated.

After producing the formed and hardened portion 7 of the first arm 8, the stabilizer 2 is taken out of the tool 14. Subsequently, the second end 15' and the second arm 8' respectively are treated analogously. The respective process shown in FIGS. 4A to 4C takes place identically to the process of producing the first arm 8. Thus, for the sake of brevity, reference is hereby made to the above description of the production of the first arm 8.

It is understood that the process as described is exemplary only and that it can be modified. For example, the stabilizer, can also be removed directly from the forming tool after having been hot formed, and can be hardened and rapidly cooled respectively by separate means. For example, after the stabilizer has been removed from the forming tool, the formed end portions 8, 8' can be cooled in a separate cooling device by means of a liquid medium.

Optionally, the tubular member can be internally blasted prior to forming and hardening the leg ends 7, 7'. After the formed and hardened portions 7, 7' have been produced, the stabilizer 2 can be externally blasted, coated and optionally provided with attaching parts.

An advantage of the stabilizer 2 and of the production process, is that the stabilizer 2 can withstand high loads and comprises a long service life due to the high strength of the end portions 7, 7'. The stabilizer ends 7, 7' can be produced in a favourable manner simply, rapidly and with high process reliability in one single tool 14, i.e., in the described combined hot-forming, punching and hardening tool 14. Hardening the end portions 7, 7' does not only achieve a higher strength, but also has a positive effect on the density of the stabilizer 2, which, overall, contributes to a long service life.

The invention claimed is:

1. A tubular stabilizer bar for a chassis of a motor vehicle, comprising:
    a torsion spring portion and two arms bent away from the torsion spring portion,
    wherein the arms each comprise a formed end portion with a through-opening and a tubular portion,
    wherein the torsion spring portion comprises a hardened structure with a strength of at least 1000 megapascals (MPa),
    wherein the formed end portions comprise a hardened structure with a strength of at least 800 MPa, and
    wherein the arms, in the tubular portion, each comprise a partial region with a low strength that is smaller than 0.7 times the strength of the torsion spring portion.

2. The tubular stabilizer bar according to claim 1, wherein the formed end portions comprise a strength which amounts to at least 0.8 times the strength of the torsion spring portion.

3. The tubular stabilizer bar according to claim 1, wherein the torsion spring portion comprises a hardness of at least 310 HV (Vickers hardness number), and that the formed end portion comprises a hardness of at least 250 HV.

4. The tubular stabilizer bar according to claim 1, wherein the formed end portion comprises a flattened end region with an approximately constant cross-section along a length of said end region, and a transition region with a variable cross-section along a length of said transition region.

5. The tubular stabilizer bar according to claim 1, wherein the strength of the partial region of the tubular portion is greater than 0.5 times the strength of the torsion spring portion.

6. The tubular stabilizer bar according to claim 5, wherein the partial region with the low strength comprises a distance from the formed end portion which distance corresponds at least to half a diameter of the tubular portion.

7. The tubular stabilizer bar according to claim 1, wherein the formed end portions of the arms are closed so as to be at least one of liquid-proof and gas-proof.

8. The tubular stabilizer bar according to claim 1, wherein there is a variable wall thickness along a length of the stabilizer, wherein a wall thickness of the end portions is smaller than a maximum wall thickness of the stabilizer bar.

9. The tubular stabilizer bar according to claim 8, wherein the wall thickness of the end portions is at least 20% smaller than the maximum wall thickness of the stabilizer, and the maximum wall thickness is formed in a bent portion between the torsion spring portion and a respective one of the arms.

10. The tubular stabilizer bar according to claim 1, wherein the stabilizer bar is produced from a steel material with a carbon content of less than 0.5% and a manganese content of 0.5% to 3.0%.

* * * * *